Feb. 3, 1970 D. V. GOLAND 3,493,015

WIRE TYING DEVICE

Filed Oct. 24, 1967 4 Sheets-Sheet 1

Feb. 3, 1970 D. V. GOLAND 3,493,015

WIRE TYING DEVICE

Filed Oct. 24, 1967 4 Sheets-Sheet 2

Feb. 3, 1970 D. V. GOLAND 3,493,015

WIRE TYING DEVICE

Filed Oct. 24, 1967 4 Sheets-Sheet 3

United States Patent Office 3,493,01

Patented Feb. 3, 197

3,493,015

WIRE TYING DEVICE

David Vere Goland, North Balwyn, Victoria, Australia, assignor to Gerrard Wire Tying Machines Company Proprietary Limited, Brooklyn, Victoria, Australia, a corporation of Victoria Filed Oct. 24, 1967, Ser. No. 677,704
Claims priority, application Australia, Oct. 26, 1966, 13,125/66
Int. Cl. B21f 9/02
U.S. Cl. 140—93.6 11 Claims

ABSTRACT OF THE DISCLOSURE

This invention relates to a device for tying a wire loop around a bale or bundle. The device includes tensioning mechanism which functions to draw the wire loop to a predetermined tension about the bale or bundle, and twisting mechanism for twisting and securing together two end portions of the wire loop and being operatively connected to the tensioning mechanism to be automatically actuated upon the aforementioned predetermined tension being attained in the wire loop.

This invention relates to wire tying devices, and is particularly although not exclusively concerned with such devices for tying relatively heavy gauge wire—i.e., gauges in the region of 10 S.W.G. for example. Such devices are used for tying a loop of wire around bales, packages and the like and will be hereinafter referred to as devices of the kind indicated. The word "bale" as hereinafter used in the description and claims is to be understood as embracing packages, bundles, parcels, and the like including a plurality of articles required to be held together for transport and/or storage.

Hitherto, considerable difficulty has been experienced in tensioning heavy gauge wire looped around a bale to the required degree before tying. Devices have been proposed for carrying out such tensioning, but they are generally unsatisfactory. In particular, although such devices have sometimes included mechanism for tensioning as well as mechanism for tying, they are constructed in such a way that the operation of both mechanisms must be performed separately. Thus, the complete tensioning and tying of a wire loop is a time-consuming task and usually requires some adjustment of the device between operation of the two mechanisms.

It is a primary object of the present invention to provide a device for tensioning and tying wire of light or heavy gauge, in which the tying operation commences automatically upon a predetermined tension being applied to the wire. Other advantages of the invention will be apparent to those skilled in the art from the following description.

According to the invention there is provided, a wire tying device including, drive means, tensioning mechanism for engaging a leading end portion of a wire loop and being operable by said drive means to move that end portion in a direction so as to draw the loop about a bale, gripper means for holding the opposite trailing end portion of the loop during said movement of the leading end portion thereof, tensioner clutch means for automatically disengaging the drive connection between the drive means and the tensioning mechanism when said loop is tensioned to a predetermined degree, twisting mechanism operable by said drive means to twist together two tie-portions of said loop located side-by-side and adjacent the leading and trailing end portions of said loop respectively, and twister clutch means operatively connected to said tensioner clutch means so as to drivably connect the twisting mech anism to the drive means in response to disengagemer of said tensioner clutch means.

The following description refers in more detail t these essential features and further optional features c the invention. To facilitate an understanding of the ir vention, reference is made to the accompanying draw ings where these features are illustrated in preferred forr It is to be understood however, that the essential an optional features of the invention are not limited to th specific forms of these features as shown in the drawings In the drawings.

Figures 1, 2:
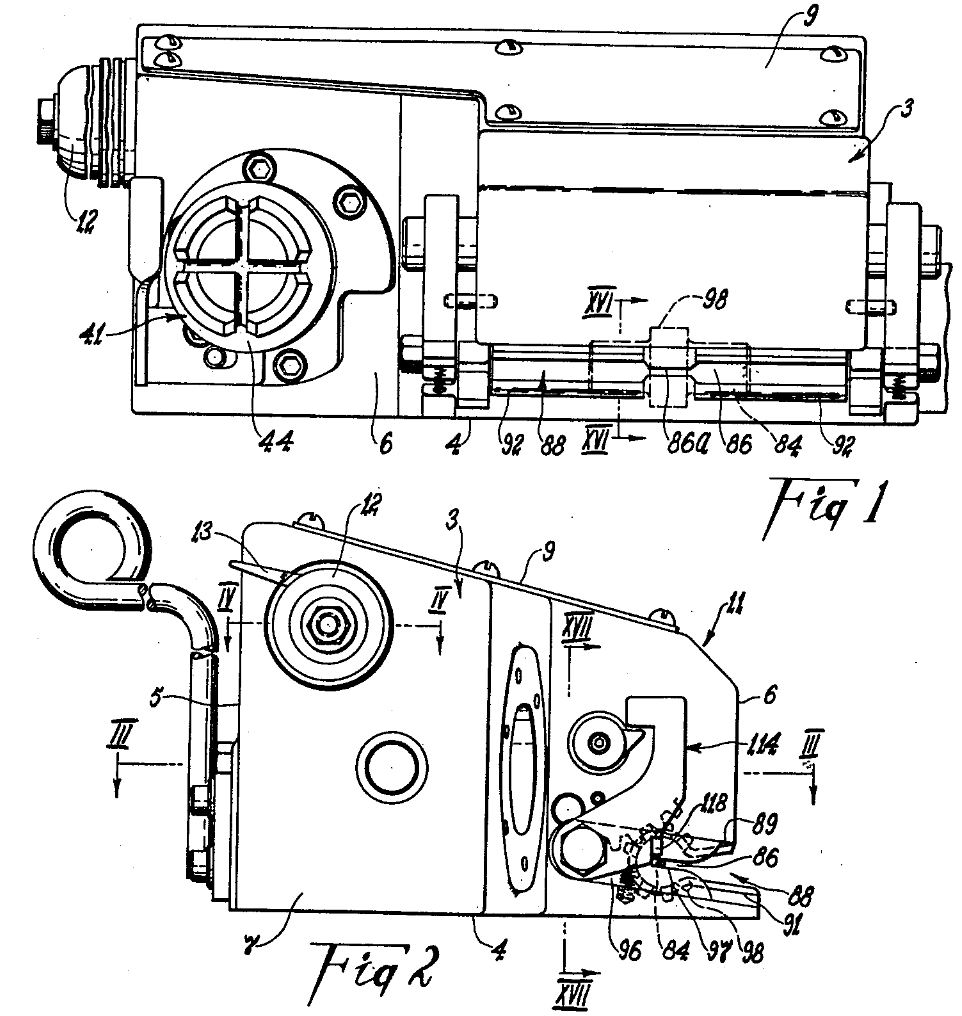
FIGURE 1 is a front elevational view of a wire tyin device according to the invention.
FIGURE 2 is a side elevational view of the devic shown in FIGURE 1.

The device according to the invention is operatively connected to suitable drive means such as an electric, hydraulic or pneumatic motor. Preferably, pneumatic motor 2 (see FIGURE 4) is employed and is mounted within a housing 3 which also contains at least part of the tensioning and twisting mechanisms.

In the preferred embodiment of the invention illustrated in the accompanying drawings, the housing 3 is elongated includes a base 4, rear wall 5, front wall 6, two end ls 7 and 8, and a removable cover plate 9. The front l 6 may be stepped to form a forwardly projecting sec- . 11 (see FIGURE 3) for containing at least part of twister mechanism as hereinafter described.

'he drive motor 2 is preferably located within the .sing 3 adjacent the rear wall 5, and is operated through air valve 12 located externally of the housing 3 but ıred thereto. The air valve 12 may be actuated by a trol lever 13 or any other convenient means which is mally urged towards a valve closing position.

Figure 4:
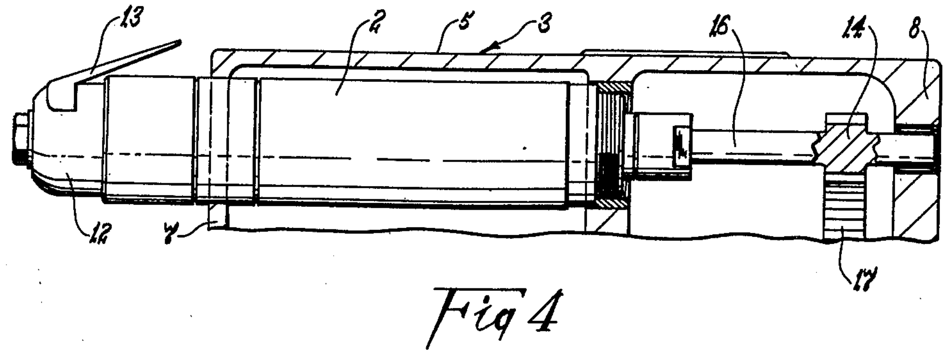
FIGURE 4 is a part sectional view taken along lin IV—IV of FIGURE 2.

)rive means operatively connecting the motor to the ;ioning and twister mechanisms may include a drive ion 14 secured to a spindle 16 which is drivably con- ted to the motor 2 at one end and has its opposite end tion rotatably mounted within the end wall 8 of the ısing 3 (see FIGURE 4). The drive pinion 14 coopera- :ly engages with a drive gear 17 (see FIGURES 3 and forming part of a tension control mechanism which ıratively connects the drive motor 2 to the tensioner. :t will be appreciated that instead of spur gears, any er means such as chain, belt or friction drives may employed as the drive connection between the motor ınd tensioning and twisting mechanisms.

[he tension control mechanism preferably includes a in shaft 18 extending longitudinally through the hous- 3 substantially parallel to the motor spindle 16 and /ing its opposite end portions rotatably mounted in end walls 7 and 8 of the housing 3. Preferably, shaft is formed in two sections 18*a* and 18*b* having their acent ends connected for relative rotation and their note ends rotatably mounted in end walls 7 and 8 pectively (see FIGURE 3). The aforementioned drive ır 17 is secured to the shaft section 18*b* intermediate ends to cause rotation thereof upon actuation of the ve motor 2. A clutch and associated pressure applying ıans also forms part of the preferred tension control :chanism.

Figure 8:
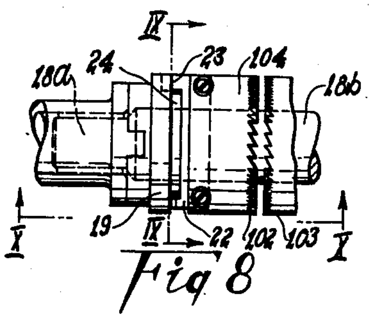
FIGURE 8 is an elevational view of the tensioner and twister clutch means showing them in the engaged and disengaged positions respectively.

Any suitable clutch may be used, but it preferably in- :des a cam plate 19 rotatably mounted on the shaft :tion 18*b* and drivably connected to shaft section 18*a* ough one or more dogs 21 (see FIGURE 8). The cam ıte 19 is also drivably engageable with a cam bar 22 ached to the shaft section 18*b*. The pressure applying ıans is adapted to normally urge the cam bar 22 into ving engagement with the cam plate 19, and the cam ıte 19 is operatively connected to the tensioner as here- ıfter described.

In one particular form as shown in FIGURES 8 to 12, ; cam plate 19 has inner and outer annular tracks 23 d 24 respectively, and a cam recess 25 and 26 respec- ely is formed in the surface of each of those tracks. ıe two cam recesses 25 and 26 are substantially in ımetrical alignment and are of substantially equal pth, and at least one side surface of each recess slopes twardly for a reason hereinafter made clear. Also, the rface of the inner track 24 is axially disposed closer to ; cam bar 22 than that of the outer track 23, a distance ch that the base of the inner track recess 26 is also ;posed closer to the cam bar 22 than the surface of the ter track 23.

Figure 3:
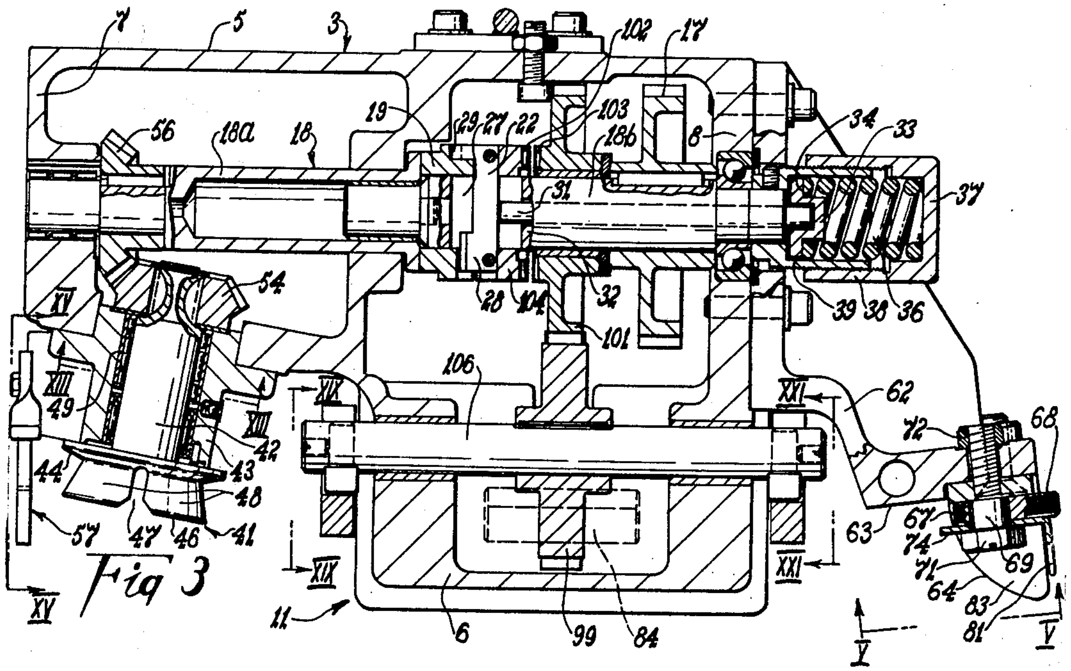
FIGURE 3 is a cross sectional view take along lin III—III of FIGURE 2.

The cam bar 22 may be square or rectangular in trans- rse cross section and slidably retained in a guide slot ' which is formed through the shaft section 18*b* and tends longitudinally thereof (see FIGURE 3). The cam ır 22 extends transversely of the axis of the main shaft ; so that opposite end portions thereof project beyond e surface of the shaft section 18*b*.

A drive lug 28 and 29 respectively extends from each ıd portion of the cam bar 22 towards the associated cam ate 19. The two drive lugs are located so that lug 28 engageable with the inner track recess 26 and the lug 29 engageable with the outer track recess 25, and they ıch have sloping side surfaces so as to be of substantial- complementary shape to their respective recesses. The drive lug 29 projects beyond the drive lug 28 because of the stepped relationship of the two tracks 23 and 24, and both lugs are adapted to engage with their respective recess 25 and 26 at the same time.

With this particular cam arrangement, each drive lug 28 and 29 is engageable with one cam recess only so that the cam bar 22 may make one complete revolution with the shaft section 18*b* relative to the cam plate 19 before a lug engages within a cam recess. Obviously, the clutch need only have one recess and cooperable lug, but two of each is preferred.

As shown in FIGURE 3, the pressure applying means may include a push rod 31 mounted for axial movement within a bore 32 extending from one end of the main shaft section 18*b* to the cam bar guide slot 27. The push rod 31 is located on the opposite side of the cam bar 22 to the cam plate 19 and has its opposite ends respectively engaging the cam bar 22 and appropriate resilient means.

In the example shown, the end portion of the push rod 31 remote from the cam bar 22 projects beyond the adjacent end of the main shaft 18 and the end wall 8 of the housing 3, and a cap member 33 having an annular shoulder 34 intermediate its ends is located over that end of the rod 31. A helical compression spring 36 forms the resilient means and is interposed between the annular shoulder 34 of the cap member 33 and a suitable abutment member.

Preferably, means are provided for adjusting the pressure applied to the cam bar 22, in which case the aforementioned abutment member may be an end wall 37 of a screw threaded adjusting nut 38 located over the spring 36 and threadably engaging with an externally screw threaded sleeve 39 fixed to and projecting from the end wall 8 of the housing 3. Thus, pressure applied to the cam bar 22 depends upon the rotational position of the adjusting nut 38 relative to the cooperating sleeve 39.

Also as shown in FIGURE 3, the tensioner may include a capstan 41 located externally of the housing 3 and rotatable about an axis extending transverse to the axis of the main shaft 18. Preferably, the capstan 41 is secured to an end of a stub shaft 42 which extends axially through, and is rotatably mounted within, a supporting boss 43 removably attached to the inwardly stepped portion of the housing front wall 6. In the preferred arrangement of the device shown, the capstan 41 and the adjusting means for the pressure applying means are located adjacent opposite end walls 7 and 8 respectively of the housing.

The capstan 41 may include a back plate 44 attached to the stub shaft 42 and a frusto-conical skirt portion 46 extending from the back plate 44 in the opposite direction to the stub shaft 42 and being flared outwardly away from the back plate 44. Preferably, the back plate 44 is of greater diameter than the skirt portion 46 to provide an annular backing flange at the inner end of the capstan 41. A number of substantially equally spaced slots 47 are formed through the wall of the skirt 46 and extend from the outer edge thereof to form a series of circumferentially spaced teeth 48. The outer end portion of each tooth 48 may be tapered to provide a lead for introduction of wire into the space between adjacent teeth 48.

Figure 13:
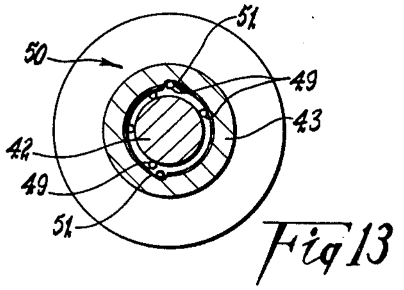
FIGURE 13 is a cross sectional view taken along line XIII—XIII of FIGURE 3.

It is preferred that a one-way clutch 50 be associated with the capstan 41 to prevent rotation thereof in one direction. In one form as shown in FIGURES 3 and 13 the clutch includes a plurality of rollers 49 arranged around the shaft 42 and each adapted to wedge between an inclined surface 51 secured to or forming part of the supporting boss 43, and the surface of the shaft 42, when the shaft 42 is rotated in one particular direction. Rotation of the shaft 42 in the opposite direction maintains the rollers 49 clear of their respective inclined surfaces 51.

Figure 14:
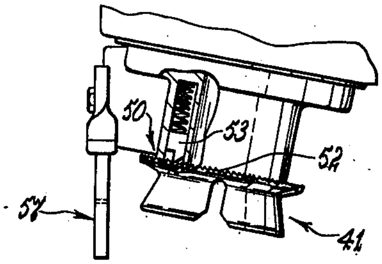
FIGURE 14 is a semi-diagrammatic sectional view of a one-way clutch alternative to that shown in FIGURE 13.
Figure 16:
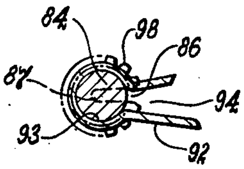
FIGURE 16 is a view taken along line XVI—XVI on FIGURE 1.

Alternatively, as shown in FIGURE 14, the one-way clutch 50 may include an annular set of ratchet teeth 52 formed on the inner face of the back plate 44 of the capstan 41. A detent 53 slidably mounted in the supporting boss 43 and spring influenced towards the capstan 41, cooperates with the ratchet teeth 52 to prevent rotation of the capstan 41 in one direction and allows rotation in the opposite direction.

As shown in FIGURE 3, the inner end portion of the capstan stub shaft 42 preferably extends through the front wall 6 of the housing 3 for operative connection to the aforementioned cam plate 19. In the preferred embodiment shown, such a connection is made through mating gears as described below, but may be obtained through any other suitable means.

A bevel pinion 54 is secured to the inner end portion of the stub shaft 42 inside the housing 3 and drivably engages with a bevel gear 56 secured to the shaft section 18*a* and thereby secured to the cam plate 19 against relative rotation. The bevel gear 56 and cam plate 19 may be formed integral with opposite end portions respectively of a sleeve forming part of the shaft section 18*a*, but they are preferably secured to that sleeve as shown in FIGURE 3. Thus, the tensioner is operated by the drive motor 2 only so long as the cam bar drive lugs 28 and 29 engage within their respective recesses 26 and 25 of the cam plate 19.

Figure 15:
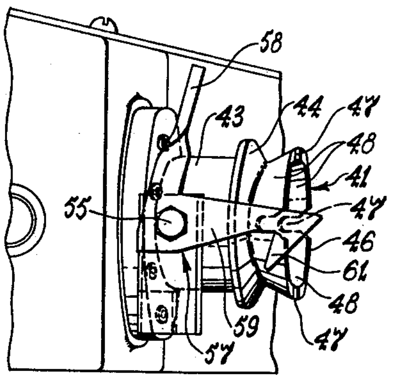
FIGURE 15 is a view taken in the direction of arrows XV—XV on FIGURE 3.

Means may be provided for holding the wire in alignment with the twister mechanism and a gripper assembly as hereinafter described. In one form as shown in FIGURE 15, such means includes a latch member 57 pivotally mounted as at 55 on the side of the supporting boss 43 remote from the twister, about an axis extending transverse to the axis of the stub shaft 42. The latch member 57 may include an actuating lever 58 and a wire engaging arm 59 which extend away from the pivotal connection 55 substantially at right angles to each other, and the latch member 57 is preferably arranged so that the actuating lever 58 extends upwardly and the wire engaging arm 59 extends outwardly from the housing 3. The outer end portion of the wire engaging arm 59 may have a downwardly extending hook element 61 which functions as hereinafter described.

A gripper assembly is provided to hold a trailing end portion of the wire loop whilst the leading end portion thereof is held by the tensioner capstan 41 during the tensioning operation. Such a gripper assembly is preferably located adjacent the side wall 8 of the housing 3 remote from the tensioner.

Figure 5:
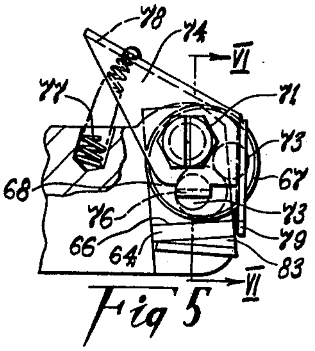
FIGURE 5 is an elevational view of the gripper as sembly of the device shown in FIGURE 1, taken in th direction of arrows V—V on FIGURE 3.
Figure 6:
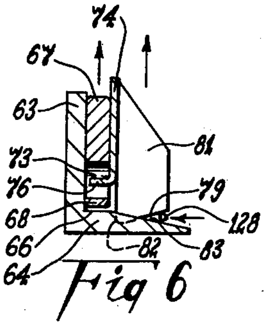
FIGURE 6 is a cross sectional view taken along lin VI—VI of FIGURE 5.

In one particular form as shown in FIGURES 3, 5 and 6, the gripper assembly includes a mounting bracket 62 secured to the side wall 8 of the housing 3 so that a substantially upright mounting wall 63 thereof is located adjacent the outwardly stepped portion of front wall 6 of the housing 3 and extends in substantially the same direction. A gripper base plate 64 is attached to the mounting wall 63 to extend outwardly therefrom and preferably has at least an inner section 66 of its upper surface sloping upwardly and away from the adjacent side wall 8 of the housing 3.

The sloping inner section 66 of the upper surface of the base plate 64 forms a stationary gripper surface, and a relatively movable gripper surface may be provided by the peripheral surface 67 of an eccentrically mounted wheel 68. Preferably, the wheel 68 is located in substantially vertical alignment with the stationary gripper surface 66 and is attached to the mounting wall 63 for movement about an eccentrically located pivot pin 69 extending transversely through the mounting wall 63. The pivot pin 63 may form the shank of a screw threaded bolt 71 which passes through the wheel 68 and mounting wall 63 and cooperates with a nut 72 to removably secure the wheel 68 in assembly with the mounting wall 63.

The position of the axis of the pivot pin 69 relative to the periphery of the wheel 68 and stationary gripper surface 66 is predetermined so that the wheel 68 is movable to releasably clamp a section of wire between the stationary and movable gripper surfaces 66 and 67 respectively. Also, it is preferred that the pivot pin 69 axis be locate closer to the adjacent side wall 8 of the housing 3 tha the central axis of the wheel 68. It is further preferre that the peripheral surface 67 of the gripper wheel 68 t knurled or otherwise prepared to provide a substantiall non-slip gripper surface. Alternatively, the stationai gripper surface 66, or both gripper surfaces 66 and 6' may be so prepared.

In the particular form of the gripper wheel 68 showi three substantially equally spaced holes 73 extend tran: versely through the wheel 68 at positions located a sul stantially equal distance from the central axis of the whee 68. The holes 73 are of substantially the same diamete and any one of them may serve as a journal bearing fc the pivot pin 69. With this arrangement, different holes 7 may be employed as the journal bearing as the grippe surface 67 of the wheel 68 wears, and thereby prolong the useful life of the gripper wheel 68.

If both gripper surfaces 66 and 67 contact a section o wire which is being pulled longitudinally towards the ad jacent side wall 8 of the housing 3, their frictional engage ment with the wire is generally sufficient to carry th wheel 68 towards the stationary gripper surface 66 s that the required clamping is obtained. Nevertheless, grip per control means may be provided, and such mean preferably includes a control arm 74 pivotally mounte intermediate its ends on the pivot pin 69 with one en portion attached to the gripper wheel 68 and the op posite end portion influenced in a direction such as t normally urge the gripper surface 67 of the wheel 6 towards the surface 66.

Preferably, a laterally inwardly extending lug 76 i formed on the control arm 74 and locates within one o the two holes 73 of the wheel 68 which are not acting a the journal bearing and thereby provides the arm attach ment to the wheel 68, and the arm 74 is influenced in th desired direction of a helical compression spring 77 inter posed between a laterally extending plate 78 attached tc the arm 74 and a part of the mounting bracket 62.

Gripper release means may be provided to enable con venient insertion of a wire section between the grippei surfaces 66 and 67. Such release means preferably in cludes upper and lower cam surfaces formed on the control arm 74 and base plate 64 respectively.

The upper cam surface may be formed by the undei surface 79 of a substantially upright lobe 81 which extends laterally outwards and downwardly from the control arm 74. The lobe 81 is positioned adjacent the end of the base plate 64 remote from the housing 3 with at least part of its cam surface 79 normally disposed beneath the adjacent end of the stationary gripper surface 66, and the inner end of the cam surface 79 terminates in an upwardly extending edge 82 of the lobe 81 which is spaced outwardly from the inner longitudinal edge of the stationary gripper surface 66.

The lower cam surface may be formed by an outward lateral extension of the base plate 64, the upper surface 83 of which slopes downwardly away from the stationary gripper surface 66. Thus, the upper and lower cam surfaces 79 and 83 respectively diverge outwardly from the gripper surfaces 66 and 67, but their respective planes normally overlap adjacent those gripper surfaces as shown in FIGURE 6.

Any appropriate twister mechanism may be employed, but such mechanism preferably includes a cylindrical twister element 84 (see FIGURES 1 to 3, 7 and 16) rotatably mounted in the forwardly projecting section 11 of the housing 3 adjacent the front wall 6 thereof with its axis extending substantially parallel to the axis of the main shaft 18. A radial slot 86 extending the full length of the twister element 84 has its base 87 located on that side of the element 84 axis remote from the open mouth of the slot 86.

Locating means is preferably provided as hereinafter described for normally retaining the twister element 84 in :st position in which the open mouth of the slot 86 is ıcent the front wall 6 of the housing 3 and adapted to :ive wire sections passed laterally through a wire re- /ing aperture 88 (see FIGURES 1 and 2) in that front l. Also, a longitudinally intermediate portion 86a of slot 86 may be narrower than the end portions thereof . preferably has a width less than twice the diameter the wire with which the device is to be used. Twister nents 84 having different width slots 86 may be inter- .ngeable to enable use of the device with both large [ small wire gauges.

:he wire receiving aperture 88 is formed with the front l side walls of the forwardly projecting section 11 of housing 3, and is preferably of substantially keyhole pe in side elevation with the circular section thereof ced inwardly from the front wall 6. Also, the section the aperture located between the circular section and front surface 6 of the housing 3 is defined between ɔer and lower surfaces 89 and 91 respectively which ferably diverge outwardly from the circular section. Mounting means for the twister element 84 may in- de a pair of bushes 92 (see FIGURES 1 and 16), each which is of substantially complementary shape to the 'e receiving aperture 88 in transverse cross section, and ocated within a separate end portion of the wire receiv- : aperture 88. The internal shape of each bush 92 may o be the substantially keyhole shape in transverse cross tion to provide a substantially cylindrical bore 93 for atably mounting an end portion of the twister ele- nt 84, and an open ended passage 94 extending radially the cylindrical bore 93 to provide communication be- :en the open mouth of the twister element slot 86 and : open mouth of the wire receiving aperture 88.

A guide plate 96 (see FIGURES 19 to 22) may be re- ɔvably secured to each side wall of the forwardly ɔjecting section 11 of the housing 3 so as to be dis- sed over remote ends of the two mounting bushes 92. ch guide plate 96 is provided with a slot 97 which is :ferably of substantially the same width as the inter- :diate portion 86a of the twister element slot 86, and ıich is in substantial alignment therewith when the ister element 84 is in its rest position. The open mouth each guide plate slot 97 may diverge outwardly for nvenient insertion of wire sections.

As with the twister element 84, the pair of guide plates may be interchangeable with other pairs of guide plates ving slots 97 of a different width, so as to enable the vice to be used with a substantially wide range of wire uges.

Figure 7:
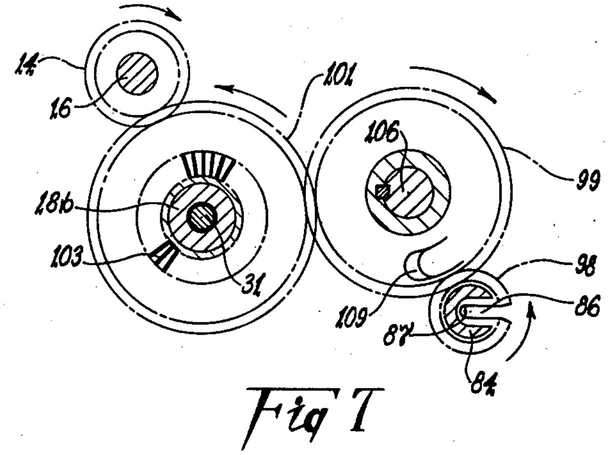
FIGURE 7 is a schematic view of part of the drive con nection between the drive motor of the device and th twisting mechanism of the device.
Figure 9:
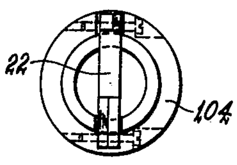
FIGURE 9 is a view taken along line IX—IX of FIGURE 8.

Actuating means for the twister 84 preferably includes spur gear train as shown in FIGURE 7, although other propriate means may be employed. Such a gear train ıy include a pinion 98 secured to the twister element 84 ermediate the ends thereof, an intermediate gear 99 tatably mounted within the housing 3 between the ister element 84 and the main shaft 18, and a main ar 101 mounted on the main shaft 18. The intermediate ırtion 86a of the twister element slot 86 preferably has open mouth disposed substantially centrally between 'o adjacent teeth of the twister pinion 98.

Furthermore, the actuating means includes twister ıtch means operatively connected to the tensioning echanism whereby the twister 84 is actuated only after predetermined tension is obtained in the wire loop. In preferred form as shown in FIGURES 3 and 7 to 11, ch clutch means includes a pair of cooperable ratchet scs 102 and 103 which are mounted on the main shaft ; and are respectively secured to the cam bar 22 and e main twister gear 101. It will be appreciated how- 'er, that the clutch means may include a pair of rela- 'ely movable members of any appropriate construction hich are associated with the tensioner and twister echanisms respectively, and which are adapted to be ·ivably engaged.

The ratchet disc 102 may be formed integral with one end of a cylindrical sleeve 104 slidably mounted on the main shaft section 18b and having the cam bar 22 secured to the opposite end portion thereof. The ratchet disc 103 may be formed integral with one side surface of the main twister gear 101 which, for the embodiment of the invention so far described, is rotatably mounted on the main shaft section 18b and is held against substantial axial movement relative thereto by spacer washers, circlips, or the like.

Figure 10:
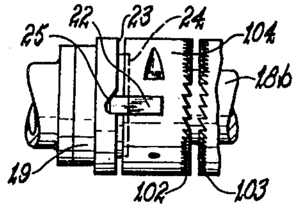
FIGURE 10 is a view taken in the direction of arrows X—X on FIGURE 8.
Figure 11:
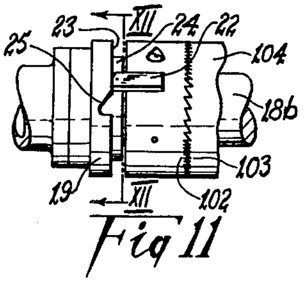
FIGURE 11 is a view similar to FIGURE 10 but showing the tensioner clutch means disengaged and the twister clutch means engaged.

When the cam bar 22 drivably engages with the tensioner cam plate 19, the ratchet discs 102 and 103 are disengaged as shown in FIGURE 10, and the axial distance between them is such that they will be in driving engagement as shown in FIGURE 11 when the drive lugs 28 and 29 of the cam bar 22 ride on their respective track surfaces 24 and 23 of the cam plate 19.

Figure 17:
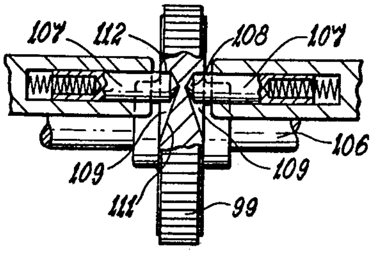
FIGURE 17 is a view taken along line XVII–XVII on FIGURE 2, parts being omitted for convenience of illustration.
Figure 18:
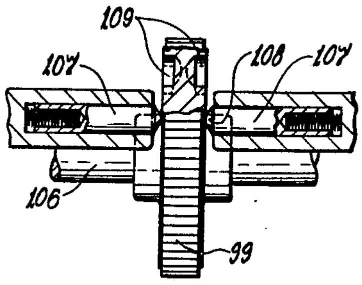
FIGURE 18 is a view similar to FIGURE 17 but showing the intermediate twister gear in a different position of rotation.

The aforementioned locating means for the twister 84 may be associated with the intermediate twister gear 99. According to one particular construction as shown in FIGURES 17 and 18, the intermediate gear 99 is secured to a spindle 106 having opposite end portions rotatably mounted in the side walls of the forwardly projecting section 11 of the housing 3. Two plungers 107 are slidably mounted in the housing 3 on opposite sides of the intermediate gear 99 for movement towards and away from that gear, and each plunger 107 has a conical nose portion 108 adapted to engage within a substantially complementary shaped recess 109 formed in the adjacent side surface of the intermediate gear 99. The plungers 107 are spring influenced towards the intermediate gear 99 and may have their axes in substantial alignment and substantially parallel to the axis of the intermediate gear spindle 106.

A cam surface or ramp 111 may slope from adjacent the base of each recess 109, and in fact forms part of that base, to the respective side surface of the intermediate gear 99 in a direction such that the plungers 107 are lifted from their respective recesses 109 when the intermediate gear 99 is rotated in one particular direction. The sides of the ramps 111 are preferably curved about the axis of the intermediate gear spindle 106, and the end surface 112 of each recess 109 remote from its respective ramp 111 may form an abutment surface for its associated plunger 107.

The locating means is so arranged that the nose portion 108 of each plunger 107 locates within its respective recess 109, and the side surface thereof engages, or is adjacent, its respective abutment surface 112 on the intermediate gear 99 when the twister element 84 is in its rest position. Although two plungers 107 are preferred, it will be apparent that suitable operation could be obtained with a single plunger 107.

Severing means may be provided to sever the tied loop from a supply source. In a preferred form such severing means also severs the surplus and portion of the loop held by the tensioner capstan 41.

According to one particular arrangement as shown in FIGURES 19 to 22, the severing means includes two cutters 113 and 114 which are respectively located adjacent opposite side walls of the forwardly projecting section 11 of the housing 3. The cutter 113 which is located adjacent the gripper will be referred to as the supply cutter, and the other cutter 114 will be referred to as the surplus cutter.

Both cutters 113 and 114 may include an arm 116 pivotally mounted at one end portion as at 117 to the adjacent side wall of the housing 3 about an axis extending substantially parallel to the axis of the twister pinion 98, and having a cutter blade 118 at its opposite end portion. The arm 116 of each cutter extends outwardly from its respective pivot 117, and is preferably influenced by a spring 120 upwardly into a position where its cutter blade 118 is held clear of sections of wire located in the twister mechanism.

The lower edge of the outer end portion of the supply cutter 113 is receiessed to provide a clear passage 121 for the wire sections in the twister mechanism, and the outermost edge of that recess forms the cutter blade 118. The position of the cutter blade 118 relative to the pivotal axis of the arm 116 of the cutter 113 is such that it will be moved inwardly to sever the outermost section of wire container within the twister mechanism, when the arm 116 of the supply cutter 113 is swung downwardly about its pivot 117.

The cutter blade 118 of the surplus cutter 114 is directed downwardly and positioned to sever the innermost section of wire contained within the twister mechanism, when the arm 116 of that cutter is moved downwardly.

Each cutter blade 118 is located adjacent one of the aforementioned guide plates 96 so that the lower surface of each guide slot 97 provides an anvil or stationary cutter blade for its adjacent cutter and thereby forms part of the severing means.

Actuating means for each cutter preferably includes a bar 119 extending upwardly from its respective cutter arm 116 and being engageable by a detent 122 which is movable with the spindle 106. Each bar 119 may have an abutment lug 123 extending rearwardly from its upper end portion for a purpose hereinafter made clear.

Figure 19:
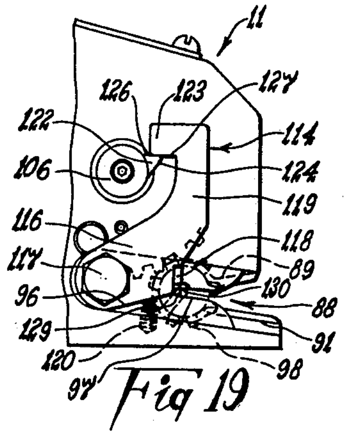
FIGURE 19 is a view taken in the direction of arrow XIX on FIGURE 3.
Figure 20:
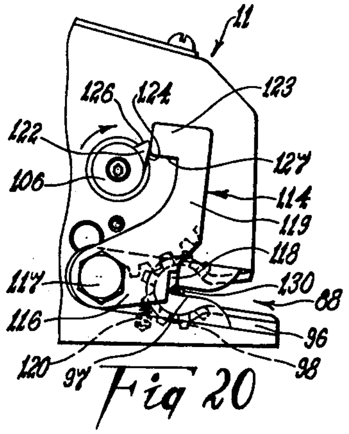
FIGURE 20 is a view similar to FIGURE 19 but showing surplus cutter in the cutting position.
Figure 21:
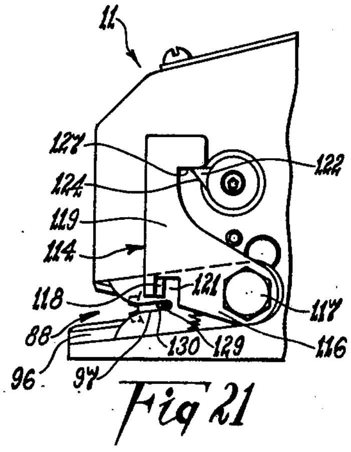
FIGURE 21 is a view taken in the direction of arrow XXI on FIGURE 3.
Figure 22:
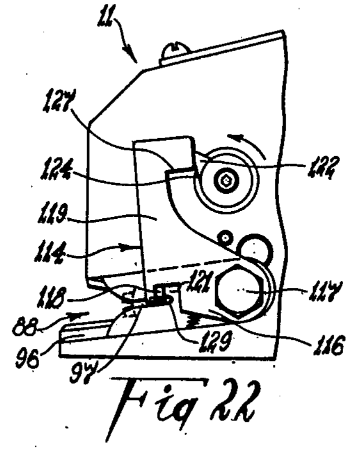
FIGURE 22 is a view similar to FIGURE 21 but showing the supply cutter in its cutting position.

The cutter detents 122 are preferably respectively secured to opposite end portions of the spindle 106 which project beyond the side walls of the housing section 11, and extend laterally outward from the surface of that spindle. Each detent 122 has a sloping actuating surface 124 and an oppositely disposed abutment surface 126, and is positioned so that its abutment surface 126 is adapted to engage with the undersurface 127 of the abutment lug 123 of its respective cutter bar 119 when the wister pinion 98 is in its rest position as shown in FIGURES 19 and 21.

Having now described the principal components of a preferred practical embodiment of the invention, the operation thereof is as follows.

The device is positioned on the upper surface of a bale to be tied, and wire is drawn from a supply source to form a loop around the bale. The leading end portion of the wire loop is located so as to extend beneath the gripper, through the twister element 84, between two pair of adjacent capstan teeth 48, and beneath the hooked arm 59 of the latch 57.

The wire may be then secured to the capstan 41 by actuating the drive motor 2 to cause say two turns of the capstans 41, thereby winding a leading end portion of the wire onto the capstan 41 so as to prevent subsequent withdrawal of the wire from between the capstan teeth 48. The flared construction of the capstan 41 and its associated backing flange 44 resists lateral movement of the wire over either end of the capstan 41.

The other or trailing end portion of the wire loop is moved laterally into the twister element slot 86 through the aperture 88 in the housing 3, and laterally into the gripper. In moving a section 128 (see FIGURE 6) of the trailing end portion into the gripper, that section 128 of wire passes between the diverging upper and lower cam surfaces 79 and 83 respectively and subsequently engages both of those surfaces. Continued lateral movement of the wire section 128 then forces the control arm 74 upwards against the action of its associated spring 77, thereby lifting the gripper wheel 68 clear of the base plate 64. When the wire section 128 has finally passed beyond the inner end of the upper cam surface 79, it is located between the gripper surfaces 66 and 67 and the control arm 74 moves downwardly until the wire section 128 is engaged by both the movable and stationary gripper surfaces 67 and 66 respectively. In this position, the wire section 128 extends through a space between the upwardly extending inner edge 82 of the control arm lobe 81, and the adjacent upright surface of the mounting wall 63.

If desired, the loop may be tensioned by hand to a certain degree by drawing the wire longitudinally towarc the supply source. The gripper construction is such as t allow longitudinal movement of the wire in that d rection, and the leading end portion of the wire is hel securely by the tensioner capstan 41.

At this stage, sections of the leading end portion an trailing end portion of the wire are located side by sid within the twister element slot 86 and the guide plat slots 97, with the leading end portion disposed inwardl of the trailing end portion. For convenience, those sec tions will be hereinafter referred to as tie-portions of th loop.

Opening of the air valve 12 by means of the contrc lever 13 then causes operation of the drive motor 2 so as t rotate the drive gear 14, which in turn causes rotation o the main shaft section **18*b*. Since at this stage there i relatively little tension on the wire loop, there is not great deal of resistance to turning movement of th tensioner capstan 41. Thus, the push rod 31 holds the can bar 22 with its drive lugs 28 and 29 in engagement with th respective recesses 26 and 25 of the cam plate 19** a shown in FIGURES 3, 8 and 10.

The cam bar 22 turns with the main shaft section 18 thereby rotating the cam plate 19 and attached bevel gea 56, and such rotation of the bevel gear 56 rotates th capstan 41 in the tensioning direction through the beve pinion 54. As the capstan 41 rotates, the extreme end sec tion of the leading end portion of the wire is wound ont the capstan 41 thereby drawing the loop of wire progres sively tighter around the bale, and the gripper surfaces 6 and 67 function to firmly section the trailing end portio of the wire against longitudinal movement.

When a predetermined tension has been obtained in th wire loop, resistance to turning movement of the capstar 41 is such that the drive lugs 28 and 29 of the cam ba 22 ride out of their respective recesses 26 and 25 in th cam plate 19 thereby moving the cam bar 22 and push roc 31 axially relative to the main shaft 18 against the actior of the associated spring 36. Rotation of the capstan 41 ceases during disengagement of the cam bar 22 and th cam plate 19, and the capstan 41 is prevented from rotat ing to any substantial degree in the reverse direction b means of the one-way clutch 50.

Figure 12:
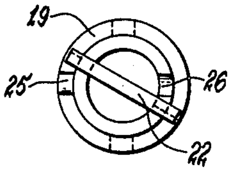
FIGURE 12 is a view taken along line XII—XII of FIGURE 11.

The cam bar 22 however, continues to be turned b the main shaft section **18*b* with the drive lugs 28 and 29 riding on their respective tracks 24 and 23 on the cam plate 19 as shown in FIGURE 12, and in this axial position of the cam bar 22 its associated ratchet disc 102 drivably engages with the ratchet disc 103 of the main twister gear 101. Thus, the main twister gear 101 is rotated with the main shaft section 18*b* and thereby causes rotation of the twister pinion 98 through the intermediate twister gear 99**.

In the twister mechanism, the intermediate portion **86*a* of the twister pinion slot 86 and the guide plate slots 97 are of such a width that the contained tie-portions 129 and 130 of wire (see FIGURES 19 to 22) are not able to pass laterally over each other. Rotation of the twister pinion 98 thereby causes sections of the wire located between the intermediate portion 86*a* of the twister pinion slot 86 and the guide plates 96 to be twisted about each other, resulting in the tie-portions 129 and 130** of the wire loop being secured together against relative longitudinal movement.

It is preferred that adequate twisting of the wire portions 129 and 130 be completed before the intermediate twister gear 99 completes one full revolution. The relative sizes of the twister gears and twister pinion are thereby predetermined to produce sufficient revolutions of the twister pinion 98 with one revolution of the intermediate twister gear 99.

When the intermediate twister gear 99 commences to rotate, the associated locating plungers 107 are lifted out of their respective recesses 109 by the ramps 111. Also, rotation of the intermediate gear 99 causes rotation of its associated spindle 106 so that the cutter detents 122 are 'ed downwardly and away from their respective abut-ıt lugs 123 on the two cutter bars 119.

.s the intermediate gear spindle 106 nears the end of complete revolution, the actuating surface 124 of ı cutter detent 122 engages an end surface of its re-:tive cutter abutment lug 123 as shown in FIGURES ınd 22, and continued movement of the spindle 106 'eby causes downward pivotal movement of the two er arms 116. Thus, the cutters 113 and 114 subse-ntly sever the trailing and leading end portions re-:tively of the wire, and severing of the two portions and 130 preferably takes place substantially simul-eously.

ievering of the leading end portion of course releases stance to turning movement by the capstan 41. Con-uently, the push rod 31 functions to re-engage the /e lugs 28 and 29 of the cam bar 22 with the recesses and 25 of the cam plate 19 when the main twister r 101 has completed one full revolution. Such re-:agement of the cam bar 22 and cam plate 19 causes engagement of the ratchet discs 102 and 103 so that ıtion of the main twister gear 101 and twister pinion ceases.

:he operator of the device will of course release the ıtrol lever 13 to close the air valve 12 and thereby p the drive motor 2 when he sees that the tensioner ıstan 41 is again rotating, since further operation of device will be ineffectual to tension or twist.

:t is preferred that the relative sizes of the intermediate ster gear 99 and main twister gear 101 and the length the ramps 111 of the intermediate gear 99, are pre-ermined so that the nose portion 108 of each locating .nger 107 is engaging its respective ramp 111 when the chet discs 102 and 103 are disengaged. The slope of ramps 111 is such that pressure applied thereto by plungers 107 causes the intermediate gear 99 to rotate the reverse direction until the plungers 107 are located ıinst their respective abutment surface 112. In this posi-n of the intermediate gear 99, the twister pinion 98 is the rest position and the cutter detents 122 are located ıeath their respective abutment lugs 123.

The device is thereby automatically reset for use with other wire loop, and the operator is only required to nove surplus wire from the capstan 41.

[t will be appreciated from the foregoing description ıt a device according to the present invention has many ıctical advantages. For example, it enables convenient ısioning and tying of wire loops with relatively heavy uge wire. Also, the tension applied to a wire loop can quickly varied by means of a simple adjustment, and adjustment of the device is required between tension-; and twisting operations.

What is claimed is:

1. A wire tying device including drive means, tension-; mechanism for engaging a leading end portion of a re loop and being operable by said drive means to ove that end portion in a direction so as to draw the op about a bale, gripper means for holding the opposite ıiling end portion of the loop during said movement of ; leading end portion thereof, tensioner clutch means r automatically disengaging the drive connection be-een the drive means and the tensioning mechanism ıen said loop is tensioned to a predetermined degree, id tensioner clutch means including a rotatable cam ıte drivably connected to said tensioning mechanism ıd a cam bar extending transversely to the axis of rota-ın of said cam plate and being drivably connected to id drive means for rotation about said axis of rotation, id cam plate having at least one radially extending recess rmed in the face thereof, and said cam bar being en-.geable within the recess for drivable connection with e cam plate to cause rotation thereof when said drive eans is actuated, twisting mechanism operable by said ive means to twist two tie portions of said loop located side-by-side and adjacent the leading and trailing end portions of said loop, respectively, and twister clutch means operatively connected to said tensioner clutch means so as to drivably connect the twisting mechanism to the drive means in response to disengagement of said tensioner clutch means.

2. A device according to claim 1, wherein said face of the cam plate includes two concentric annular tracks located one within the other, one of said tracks being located axially beyond the other track in the direction towards the cam bar, one of said recesses being formed in each said track on opposite sides of the axis of the plate and in substantial alignment, each said recess having a sloping side surface, the cam bar having a pair of axially projecting drive lugs each of which is locatable within a respective one of said recesses for engagement with the sloping surface thereof to provide said drivable connection with the cam plate, and said sloping surfaces being operable to lift the drive lugs out of their respective recesses and thereby disengage the tensioner clutch means when said predetermined tension has been attained.

3. A device according to claim 1, wherein said twister clutch means includes a pair of cooperable ratchet discs, forming driving and driven discs respectively, said driving disc being secured to the cam bar for rotational and axial movement therewith, and the driven disc being connected to said twisting mechanism to cause operation of same upon engagement with the driving disc during actuation of said drive means, said discs being arranged to be cooperatively engaged when said cam bar is disengaged from the recess or recesses of the cam plate.

4. A device according to claim 3, wherein adjusting means is provided for adjusting the pressure applied to the tension clutch means by said pressure applying means in accordance with the tension desired to be applied to the loop.

5. A device according to claim 4, wherein said pressure applying means includes a push rod arranged in substantial axial alignment with said cam plate and having one end engaging the cam bar at the side thereof remote from the cam plate, said push rod being adapted for longitudinal movement relative to the cam plate; and said adjusting means includes a helical compression spring acting upon the opposite end of the push rod to urge said rod towards the cam bar, and a nut member adjustably mounted upon a housing for part of the device and having an end wall axially spaced from said opposite end of the push rod, said spring being interposed between said end wall and said opposite end of the push rod so that the compression thereof may be varied by adjustment of the nut member relative to the housing.

6. A device according to claim 5, wherein said push rod is slidable longitudinally within an axial bore formed through a main drive shaft, said shaft being mounted within said housing for rotation upon actuation of said drive means, said cam bar being retained within a guide slot formed in one end portion of the drive shaft so as to be movable axially relative to the drive shaft and held against substantial rotational movement relative thereto, and said driven ratchet disc being rotatably mounted upon said drive shaft and held against substantial axial movement relative thereto.

7. A device including drive means; tensioning mechanism for engaging a leading end portion of a wire loop and being operable by said drive means to move that end portion in a direction so as to draw the loop about a bale; gripper means for holding the opposite trailing end portion of the loop during said movement of the leading end portion thereof; tensioning clutch means which when engaged drivably connects the drive means to the tensioning mechanism; pressure applying means arranged to urge said tensioner clutch means into the engaged condition and to allow disengagement thereof when said loop is tensioned to a predetermined degree; twisting mechanism operable by said drive means to twist together two tie portions of said loop located side-by-side and adjacent the leading and trailing end portions of said loop, respectively; twister clutch means operatively connected to said tensioner clutch means so as to drivably connect the twisting mechanism to the drive means in response to disengagement of said tensioner clutch means; and severing means operatively connected to said twisting mechanism to sever said loop from a source of supply of wire and from surplus wire engaged by said tensioning mechanism, as twisting of said tie portions is completed, said severing means includes a spindle operatively connected to said twisting mechanism for rotation in response to actuation of said twisting mechanism, a pair of cutters located on opposite sides, respectively, of said twisting mechanism, and a detent at each end of said spindle positioned for engagement with a respective one of said cutters, said detents functioning to move their respective cutters into an operative position as the twisting operation is completed.

8. A device according to claim 7, wherein said tensioning mechanism includes a rotatable capstan operatively connected to the tensioner clutch means through a one-way clutch.

9. A device according to claim 7, wherein said gripper means includes, a gripper base, a wheel mounted for pivotal movement about an eccentric axis to clamp said trailing end portion of the loop between its peripheral surface and said gripper base, said wheel being spring influenced towards said gripper base and having its pivotal axis positioned so that the peripheral surface of the wheel is drawn towards the gripper base as said loop is tensioned by virtue of frictional engagement between said trailing end portion and said peripheral surface.

10. A device according to claim 9, including gripper release means having an upper cam surface and a lower sloping cam surface which overlap adjacent said wheel, the upper cam surface being attached to said wheel for movement therewith and the lower cam surface being attached to said gripper base; said cam surfaces being arranged to receive a section of said trailing end portion of the loop between their end portions remote from the wheel so that as said wire section is moved laterally towards the adjacent surfaces of the wheel and gripper base, the upper cam surface is lifted away from the gripper base and thereby raises the wheel to allow location of said wire section between the wheel and gripper base.

11. A device including drive means, tensioning mechanism for locating a leading end portion of a wire loop and being operable by said drive means to move that end portion in a direction so as to draw the loop about a bale; gripper means for holding the opposite trailing end portion of the loop during stid movement of the leading end portion thereof; tensioner clutch means whe engaged drivably connects the drive means to the ter sioning mechanism; pressure applying means arrange to urge said tensioner clutch means into the engage condition and to allow disengagement thereof whe said loop is tensioned to a predetermined degree; twist ing mechanism operable by said drive means to twis together two tie portions of said loop located side-by side and adjacent the leading and trailing end portion of said loop, respectively; said twisting mechanism hav ing a rotatable twister mechanism located intermediat the tensioning mechanism and the gripper means, a radia slot formed through the outer surface of said twiste element and extending the full length thereof, an locating means for normally retaining the twister elemen in a raised portion in which the slot thereof is positione to receive or discharge said side portions of the loop said locating means including a pinion gear secured tc the twister element intermediate the ends thereof, ar intermediate gear meshing with said pinion and havin a recess formed within at least one side face thereof and a spring influenced plunger engageable with saic intermediate gear recess, said intermediate gear recess having a base which slopes outwardly to the adjacen side face of the intermediate gear and which is operable to lift the respective plunger from the recess during rotation of the intermediate gear in one direction, and having an abutment surface at the end thereof opposite to the end at which the sloping base merges with the respective side face of the intermediate gear; the arrangement being such that when said twister mechanism is not connected to the drive means, said plunger is cooperable with the sloping base of its respective recess to cause rotation of said intermediate gear in a direction opposite to said one direction until the plunger engages the abutment surface of its respective recess, at which position said twister element is in its rest position, and twister clutch means operatively connected to said tensioner clutch means so as to drivably connect the twister mechanism to the drive means in response to disengagement of said tensioner clutch.

References Cited

UNITED STATES PATENTS

| | | | |
|---|---|---|---|
| 1,601,196 | 9/1926 | Wolff | 140—93.6 |
| 1,956,234 | 4/1934 | Cox | 140—93.6 |
| 1,971,021 | 8/1934 | Spoor | 140—93.6 |
| 3,037,534 | 6/1962 | Brouse | 140—93.6 |

CHARLES W. LANHAM, Primary Examiner

L. A. LARSON, Assistant Examiner